United States Patent
Watson

(10) Patent No.: US 9,769,195 B1
(45) Date of Patent: Sep. 19, 2017

(54) SYSTEMS AND METHODS FOR EFFICIENTLY ALLOCATING RESOURCES FOR BEHAVIORAL ANALYSIS

(71) Applicant: Symantec Corporation, Mountain View, CA (US)

(72) Inventor: Andrew Watson, Gloucestershire (GB)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 14/687,944

(22) Filed: Apr. 16, 2015

(51) Int. Cl.
*H04L 29/06* (2006.01)
*H04L 12/911* (2013.01)

(52) U.S. Cl.
CPC .......... *H04L 63/1441* (2013.01); *H04L 47/82* (2013.01)

(58) Field of Classification Search
CPC ............................. H04L 63/1441; H04L 47/82
See application file for complete search history.

(56) References Cited

U.S. PATENT DOCUMENTS

| | | | | |
|---|---|---|---|---|
| 8,401,982 B1* | 3/2013 | Satish | ................... | G06F 21/566 706/12 |
| 8,973,133 B1 | 3/2015 | Cooley | | |
| 2009/0138972 A1* | 5/2009 | Scales | ..................... | G06F 21/56 726/24 |
| 2011/0154489 A1* | 6/2011 | Jeong | ................. | H04L 63/1416 726/22 |
| 2012/0216046 A1* | 8/2012 | McDougal | .............. | G06F 21/56 713/183 |
| 2012/0297488 A1* | 11/2012 | Kapoor | ................. | H04L 63/145 726/24 |
| 2013/0174257 A1* | 7/2013 | Zhou | ................... | H04L 63/1416 726/23 |
| 2015/0324580 A1* | 11/2015 | Lee | ......................... | G06F 21/52 726/23 |
| 2016/0006766 A1* | 1/2016 | Joo | ....................... | H04L 63/145 726/1 |

OTHER PUBLICATIONS

Sourabh Satish; Systems and Methods for Predicting Optimum Run Times for Software Samples; U.S. Appl. No. 13/794,720, filed Mar. 11, 2013.

(Continued)

*Primary Examiner* — Joseph P Hirl
*Assistant Examiner* — J. Brant Murphy
(74) *Attorney, Agent, or Firm* — FisherBroyles LLP

(57) ABSTRACT

A computer-implemented method for efficiently allocating resources for behavioral analysis may include (1) determining a file type of a first file subject to behavioral analysis, (2) loading the first file within an environment for behavioral analysis to observe at least one behavior within the environment attributable to the first file, (3) observing a malicious behavior within the environment and attributing the malicious behavior to the first file, (4) determining a timing of the malicious behavior after loading the first file within the environment, and (5) limiting an amount of time dedicated to analyzing a second file within the environment based at least in part on the timing of the malicious behavior after loading the first file within the environment and due to the second file being of the same file type as the first file. Various other methods, systems, and computer-readable media are also disclosed.

20 Claims, 6 Drawing Sheets

(56) References Cited

OTHER PUBLICATIONS

Fanglu Guo; Systems and Methods for Monitoring Programs; U.S. Appl. No. 14/585,233, filed Dec. 30, 2014.
James Yun; Systems and Methods for Creating Behavioral Signatures Used to Detect Malware; U.S. Appl. No. 14/656,739, filed Mar. 13, 2015.
Andrew Watson, et al.; Systems and Methods for Detecting Suspicious Files; U.S. Appl. No. 14/138,124, filed Dec. 23, 2013.
"FOR610: Reverse-Engineering Malware: Malware Analysis Tools and Techniques", http://www.sans.org/course/reverse-engineering-malware-malware-analysis-tools-techniques, as accessed Feb. 17, 2015, SANS™ Institute, (Sep. 7, 2012).
"Malware Dynamic Analysis", http://opensecuritytraining.info/MalwareDynamicAnalysis.html, as accessed Feb. 17, 2015, (Apr. 25, 2013).
"Chapter 6: Malware Analysis Basics", http://www.porcupine.org/forensics/forensic-discovery/chapter6.html, as accessed Feb. 17, 2015, (Jan. 16, 2006).
Julkunen, Petro et al., "Feasibility of automated analysis and inter-examiner variability of cortical silent period induced by transcranial magnetic stimulation", http://www.ncbi.nlm.nih.gov/pubmed/23660523, as accessed Feb. 17, 2015, Journal of Neuroscience Methods, vol. 217, Issues 1-2, (Jul. 15-30, 2013), pp. 75-81.
Mazeh, Tsevi, "Automated Analysis of Light Curves of OGLE LMC Binaries: The Period distribution", http://link.springer.com/chapter/10.1007%2F978-1-4020-5027-5_85#page-1, as accessed Feb. 17, 2015, Close Binaries in the 21st Century: New Opportunities and Challenges, (2006), pp. 341-344.
Arief, Zainal et al., "Development of automated and semi-automated analysis software for coronary rest period", https://www.academia.edu/6288200/Development_of_automated_and_semi-automated_analysis_software_for_coronary_rest_period, as accessed Feb. 17, 2015, Journal of Cardiovascular Magnetic Resonance, 13th Annual SCMR Scientific Sessions, Phoenix, AZ, (Jan. 21, 2010).

* cited by examiner

SYSTEMS AND METHODS FOR EFFICIENTLY ALLOCATING RESOURCES FOR BEHAVIORAL ANALYSIS

BACKGROUND

Behavioral analysis generally involves observing the behaviors exhibited by files over a predetermined period of time. For example, a behavioral analysis system may load, execute, and/or interact with a file to observe whether the file exhibits any potentially malicious behaviors. In some cases, a behavioral analysis system may be responsible for analyzing a large number of files. However, the behavioral analysis system inevitably works with a limited amount of resources. Accordingly, the behavioral analysis system ordinarily eventually terminates the analysis of a given file (e.g., freeing resources to analyze a new file). By loading, executing, and/or interacting with files over a sufficient period of time, behavioral analysis systems may be generate information regarding the safety, nature, health, and/or stability of the files.

Unfortunately, conventional behavioral analysis systems may suffer from various shortcomings and inefficiencies. For example, a conventional behavioral analysis system may be unable to accurately predict how much time is needed to observe all of the interesting behaviors exhibited by a particular file. On the one hand, in the event that too much time is dedicated to analyzing the file, the behavioral analysis system may be dedicating time and resources to the file without gaining new relevant information. On the other hand, in the event that too little time is dedicated to analyzing the file, the behavioral analysis system may run the risk of not observing relevant behaviors exhibited by the file (e.g., behaviors indicating that the file is unsafe and/or malicious).

Accordingly, the instant disclosure identifies and addresses a need for additional and improved systems and methods for efficiently allocating resources for behavioral analysis.

SUMMARY

As will be described in greater detail below, the instant disclosure generally relates to systems and methods for efficiently allocating resources for behavioral analysis by determining how long files of given file types take to exhibit behaviors of interest (e.g., malicious behaviors) and, in light of such determinations, adjusting the amount of time dedicated to behavioral analysis for files based on their file types.

In one example, a computer-implemented method for efficiently allocating resources for behavioral analysis may include (1) determining a file type of a first file subject to behavioral analysis, (2) loading the first file within an environment for behavioral analysis to observe at least one behavior within the environment attributable to the first file, (3) observing a malicious behavior within the environment and attributing the malicious behavior to the first file, (4) determining a timing of the malicious behavior after loading the first file within the environment, and (5) limiting an amount of time dedicated to analyzing a second file within the environment based at least in part on the timing of the malicious behavior after loading the first file within the environment and due to the second file being of the same file type as the first file.

In some examples, loading the first file within the environment may include loading the first file within a virtual machine designated for behavioral analysis.

In some examples, limiting the amount of time dedicated to analyzing the second file within the environment may be based at least in part on timing information of observed malicious behaviors after loading each of a plurality of files of the file type.

In some examples, the computer-implemented method may further include limiting the amount of time dedicated to analyzing each of a plurality of files of the file type within the environment based at least in part on the timing of the malicious behavior after loading the first file within the environment and due to the files being of the same file type as the first file.

In some examples, limiting the amount of time dedicated to analyzing a second file within the environment may include creating an association between the file type and a time limit that may be based at least in part on the timing of the malicious behavior after loading the first file and subjecting analysis of files of the file type with the time limit based on the association between the file type and the time limit.

In one embodiment, the computer-implemented method may further include (1) identifying a third file subject to behavioral analysis, the third file being of the file type, (2) exceeding the time limit when analyzing the third file within the environment, (3) observing a late malicious behavior attributable to the third file after the time limit, and (4) modifying the association between the file type and the time limit by extending the time limit for files of the file type based at least in part on having observed the late malicious behavior after the time limit.

In some examples, exceeding the time limit may be at least partly in response to determining that excess computing capacity is available for the environment.

In some examples, the computer-implemented method may further include analyzing the second file for the amount of time and determining that the second file is malicious.

In some examples, the computer-implemented method may further include associating an identifier of the second file with an assessment of the second file indicating that the second file is malicious.

In some examples, determining the timing of the malicious behavior after loading the first file within the environment may include measuring a length of time between loading the first file within the environment and observing the malicious behavior.

In one embodiment, the file type of the first file may include a file format of the first file.

In one embodiment, the computer-implemented method may further include identifying a different type of file, the different type of file being of a different file type from the file type of the first file and the second file and limiting the different type of a file to a different amount of time for analysis because the different type of file is of the different file type from the file type of the first file and the second file.

In one embodiment, a system for implementing the above-described method may include (1) a determination module, stored in memory, that determines a file type of a first file subject to behavioral analysis, (2) a loading module, stored in memory, that loads the first file within an environment for behavioral analysis to observe at least one behavior within the environment attributable to the first file, (3) an observation module, stored in memory, that observes a malicious behavior within the environment and attribute the malicious behavior to the first file, (4) a timing module, stored in memory, that determines a timing of the malicious behavior after loading the first file within the environment, (5) a limitation module, stored in memory, that limits an amount of time dedicated to analyzing a second file within the environment based at least in part on the timing of the malicious behavior after loading the first file within the environment and due to the second file being of the same file type as the first file, and (6) at least one physical processor configured to execute the determination module, the loading module, the observation module, the timing module, and the limitation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine a file type of a first file subject to behavioral analysis, (2) load the first file within an environment for behavioral analysis to observe at least one behavior within the environment attributable to the first file, (3) observe a malicious behavior within the environment and attributing the malicious behavior to the first file, (4) determine a timing of the malicious behavior after loading the first file within the environment, and (5) limit an amount of time dedicated to analyzing a second file within the environment based at least in part on the timing of the malicious behavior after loading the first file within the environment and due to the second file being of the same file type as the first file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
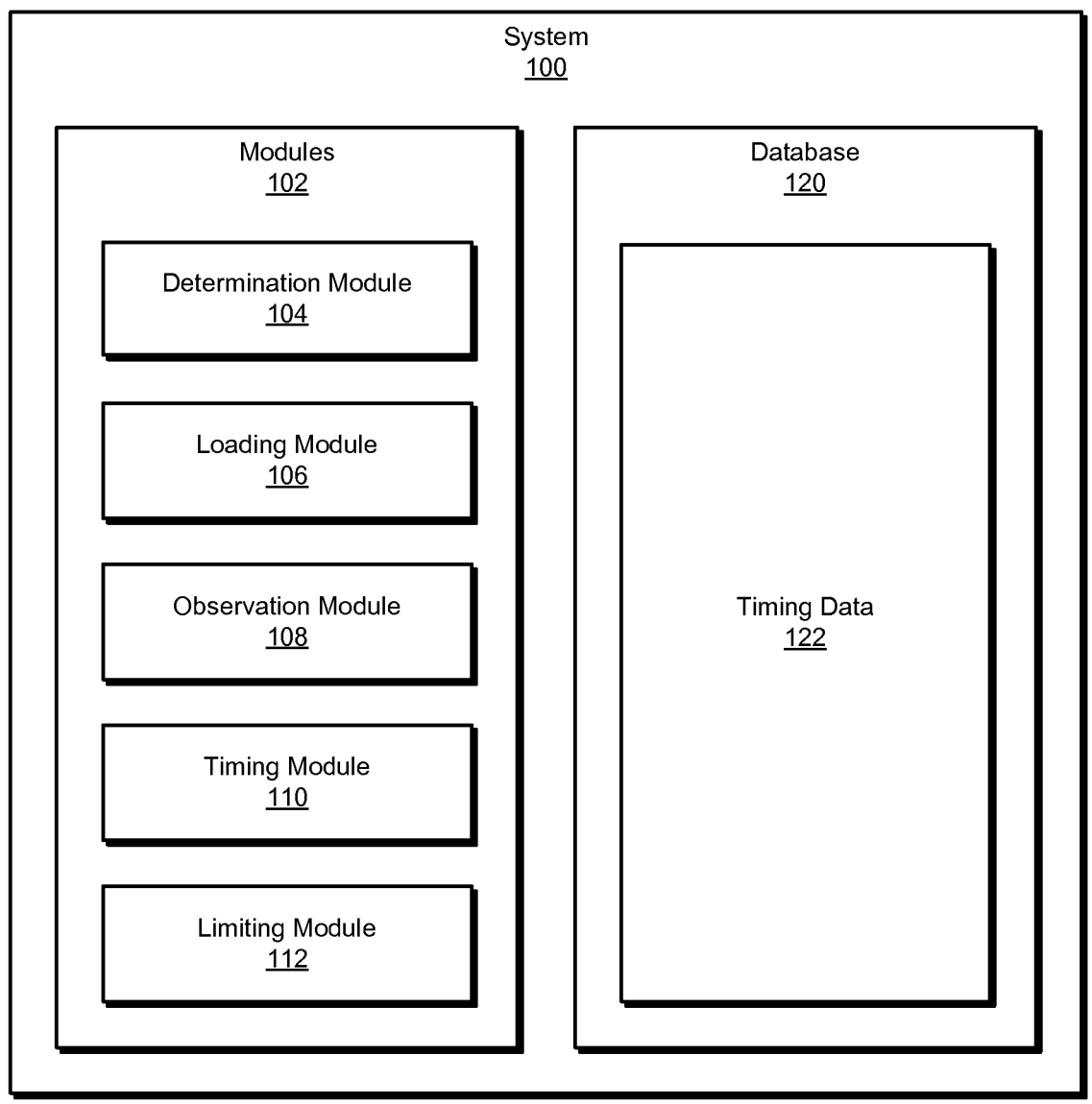
FIG. 1 is a block diagram of an exemplary system for efficiently allocating resources for behavioral analysis.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficiently allocating resources for behavioral analysis. As will be explained in greater detail below, by determining how long files of given file types take to exhibit behaviors of interest (e.g., malicious behaviors) and, in light of such determinations, adjusting the amount of time dedicated to behavioral analysis for files based on their file types, the systems and methods described herein may optimally allocate computing time and resources for the behavioral analysis of files.

Figure 2:
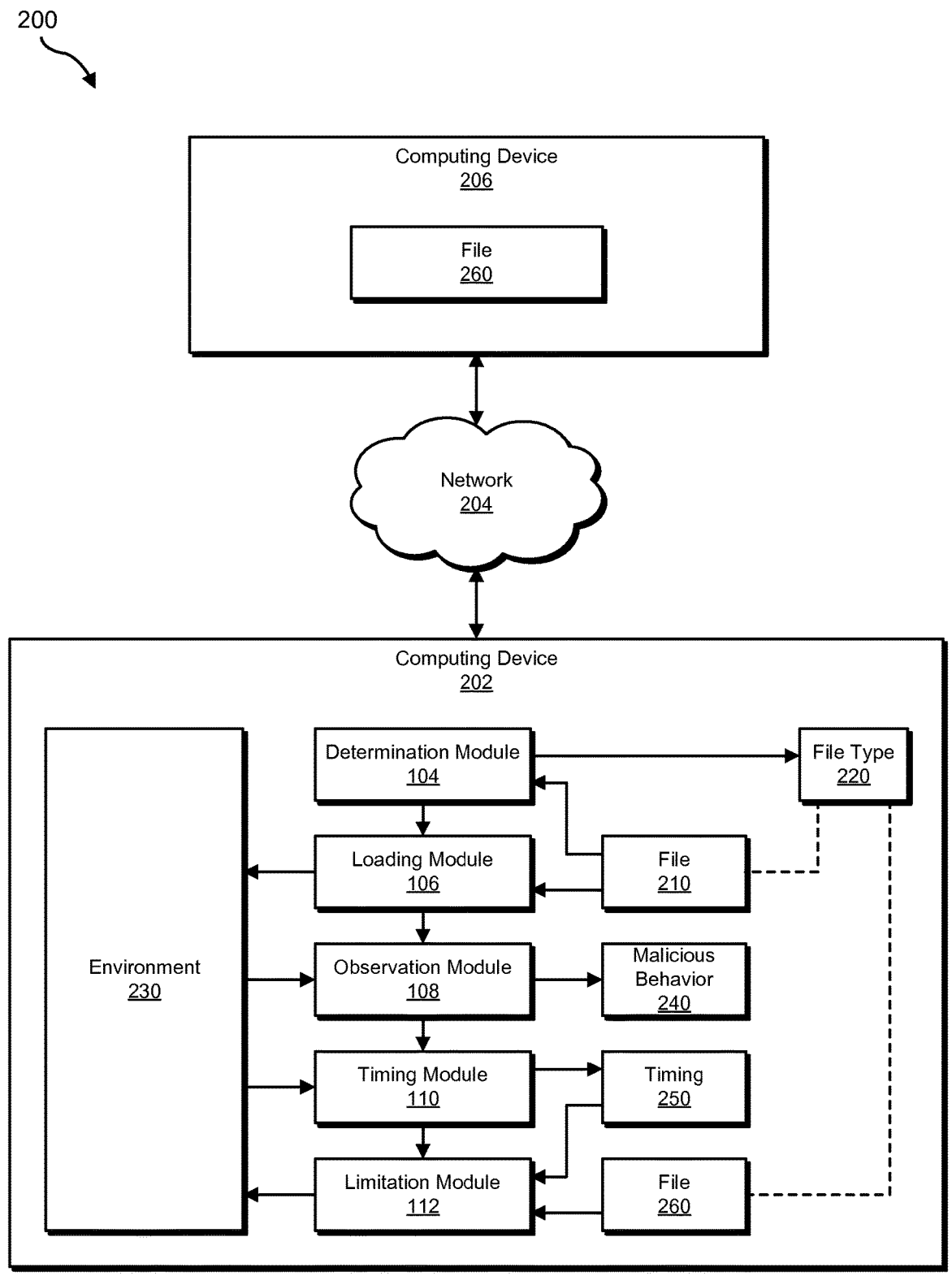
FIG. 2 is a block diagram of an additional exemplary system for efficiently allocating resources for behavioral analysis.
Figure 3:
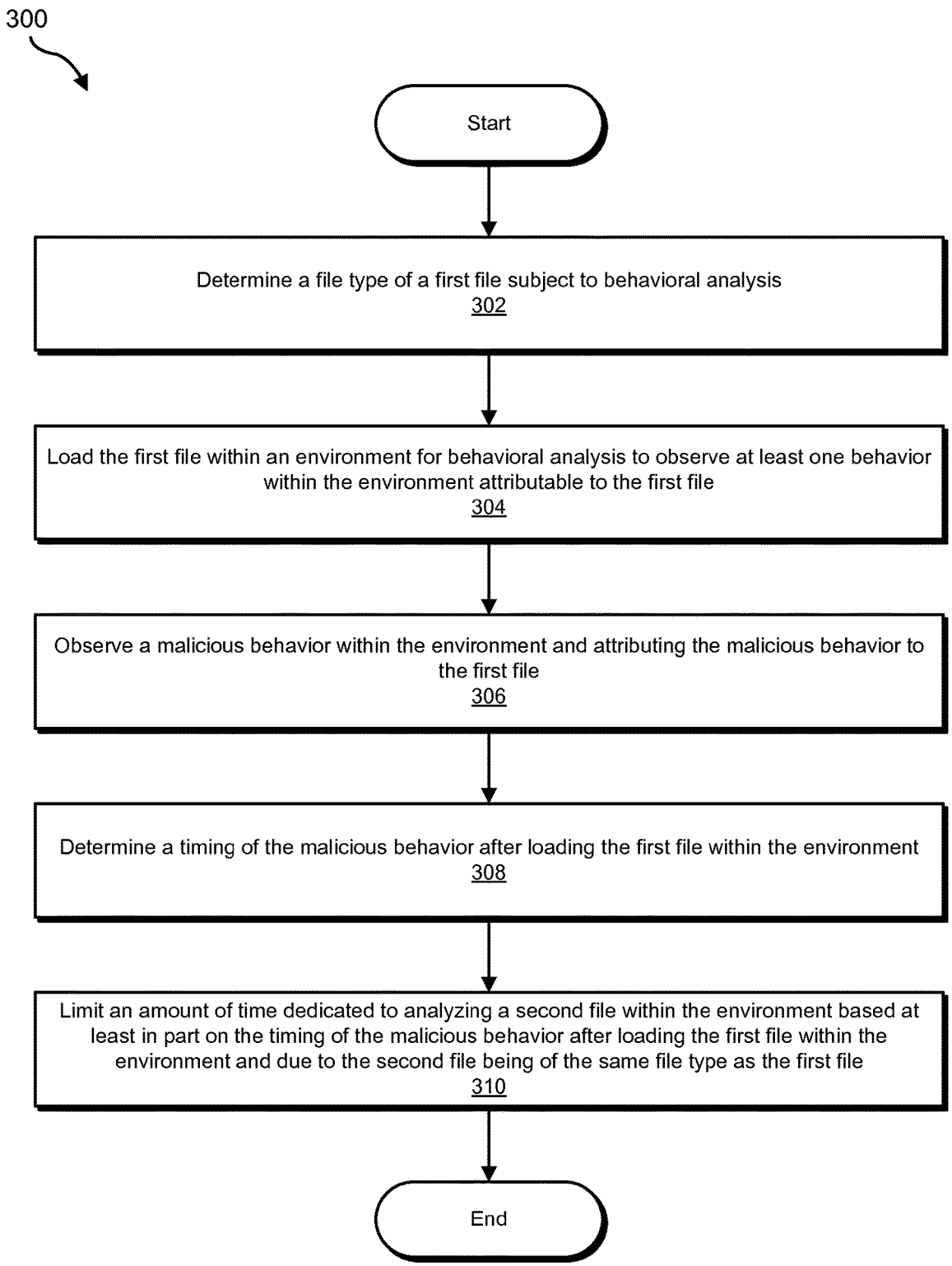
FIG. 3 is a flow diagram of an exemplary method for efficiently allocating resources for behavioral analysis.
Figure 4:
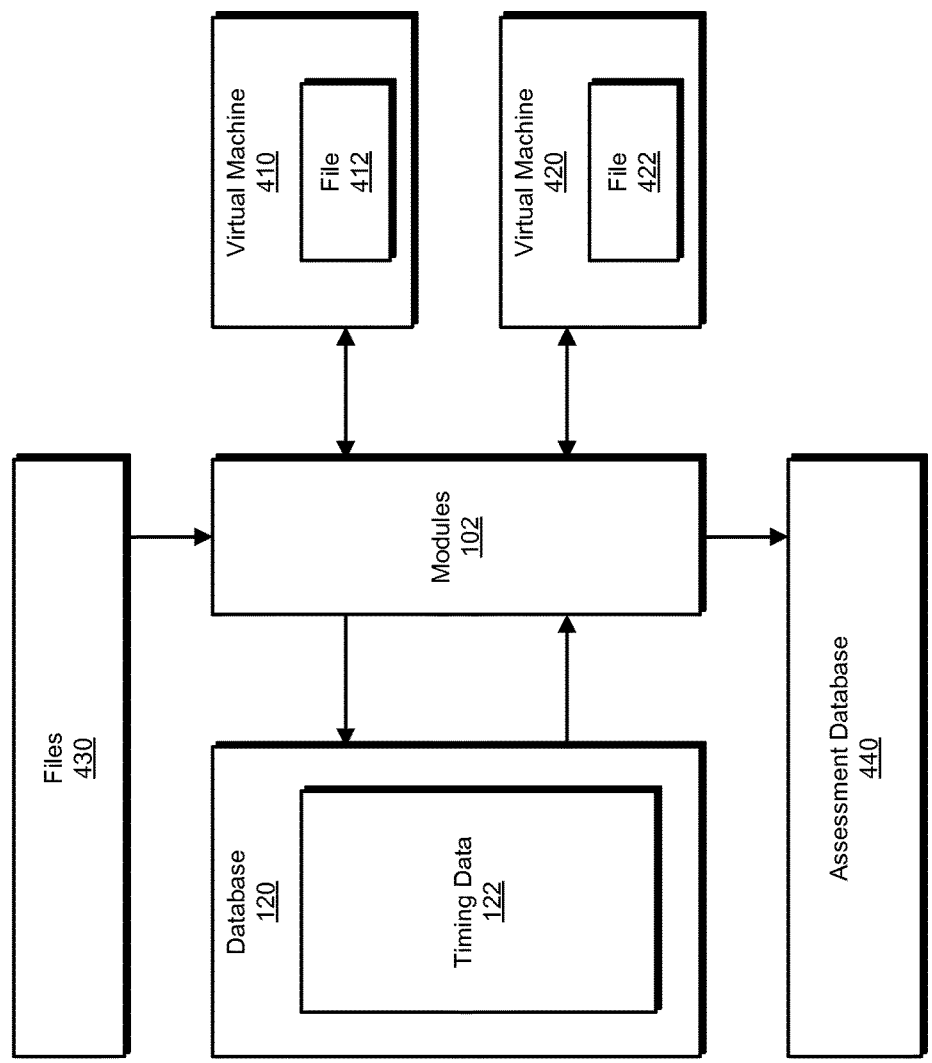
FIG. 4 is a block diagram of an exemplary computing system for efficiently allocating resources for behavioral analysis.

The following will provide, with reference to FIGS. 1, 2, and 4, detailed descriptions of exemplary systems for efficiently allocating resources for behavioral analysis. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for efficiently allocating resources for behavioral analysis. As illustrated in this figure, exemplary system 100 may include one or more modules 102 for performing one or more tasks. For example, and as will be explained in greater detail below, exemplary system 100 may also include a determination module 104 that may determine a file type of a first file subject to behavioral analysis. Exemplary system 100 may additionally include a loading module 106 that may load the first file within an environment for behavioral analysis to observe at least one behavior within the environment attributable to the first file. Exemplary system 100 may also include an observation module 108 that may observe a malicious behavior within the environment and attribute the malicious behavior to the first file. Exemplary system 100 may additionally include a timing module 110 that may determine a timing of the malicious behavior after loading the first file within the environment. Exemplary system 100 may also include a limitation module 112 that may limit an amount of time dedicated to analyzing a second file within the environment based at least in part on the timing of the malicious behavior after loading the first file within the environment and due to the second file being of the same file type as the first file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store timing data 122 that indicates the timing of behavioral observations of one or more files and/or types of files (e.g. indicating how long behavioral analyses on files run until one or more behaviors of interest are observed).

Database 120 may represent portions of a single database or computing device or a plurality of databases or computing devices. For example, database 120 may represent a portion of computing device 202 and/or computing device 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing device 206 via a network 204. In one example, computing device 202 may be programmed with one or more of modules 102 and/or may store all or a portion of the data in database 120. Additionally or alternatively, computing device 206 may be programmed with one or more of modules 102 and/or may store all or a portion of the data in database 120.

In one embodiment, one or more of modules 102 from FIG. 1 may, when executed by at least one processor of computing device 202 and/or computing device 206, enable computing device 202 and/or computing device 206 to efficiently allocating resources for behavioral analysis]. For example, and as will be described in greater detail below, one or more of modules 102 may cause computing device 202 and/or computing device 206 to efficiently allocating resources for behavioral analysis. For example, and as will be described in greater detail below, determination module 104 may determine a file type 220 of a file 210 subject to behavioral analysis. Loading module 106 may load file 210 within an environment 230 for behavioral analysis to observe at least one behavior within environment 230 attributable to file 210. Observation module 108 may observe a malicious behavior 240 within environment 230 and attribute malicious behavior 240 to file 210. Timing module 110 may determine a timing 250 of malicious behavior 240 after loading file 210 within environment 230. Limitation module 112 may limit an amount of time dedicated to analyzing a file 260 within environment 230 based at least in part on timing 250 of malicious behavior 240 after loading file 210 within environment 230 and due to file 260 being of the same file type 220 as file 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, computing device 202 may represent a computing system for conducting behavioral analyses. For example, computing device 202 may represent a computing system controlled by a security vendor for analyzing files for undesired behavior, trustworthiness, and/or maliciousness. In some examples, computing device 202 may include one or more virtual machines within which files are analyzed.

Computing device 206 generally represents any type or form of computing device that is capable of providing, storing, and/or transmitting a file. Examples of computing device 206 include, without limitation, application servers and database servers configured to provide various database services and/or run certain software applications, client systems (e.g, configured with security systems for requesting analysis of files), and Internet-connected servers that host, create, and/or transmit files.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and computing device 206.

FIG. 3 is a flow diagram of an exemplary computer-implemented method 300 for efficiently allocating resources for behavioral analysis. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may determine a file type of a first file subject to behavioral analysis. For example, determination module 104 may, as part of computing device 202 in FIG. 2, determine file type 220 of a file 210 subject to behavioral analysis.

The term "behavior," as used herein, generally refers to any observable actions, outcomes, and/or patterns produced by an interaction of a file with a computing environment. For example, the term "behavior" of a file may refer to actions produced by loading a file, by executing a file, by performing an operation on a file, and/or by performing on operation based on the file. In some examples, the term "behavior" as it relates to a file may refer to an action and/or outcome attributable to the file (e.g., rather than to the computing environment within which the file is observed). Additionally or alternatively, the term "behavior" as it relates to a file may refer to an action and/or outcome attributable to the particular content of a file rather than the file type of the file. For example, the term "behavior" may refer to an action and/or outcome observed in relation to the file that may not have been observed from a different file of the same file type. In some examples, the behavior of a file may include an action directly performed by the file in execution. Additionally or alternatively, the behavior of a file may include an action performed by a process that has interacted with the file (i.e., due to the interaction between the process and the file). Examples of behaviors may include, without limitation, write operations, read operations, volatile memory operations, application programming interface calls, inter-process communications, and network communications.

The term "behavioral analysis," as used herein, generally refers to any procedure, process, and/or technique for monitoring, observing, and/or determining one or more behaviors of a file. In some examples, a behavioral analysis may occur within a controlled computing environment. For example, a behavioral analysis may occur within a virtualized environment (such a virtual machine) that is configured to provide consistent and/or controlled conditions within which to observe a file. Furthermore, in this manner the behavior of a file may be contained within the virtualized environment (e.g., thereby preventing an adverse behavior from causing a persistent negative impact), and the virtualized environment may easily be reset for analyzing a subsequent file. In some examples, a system for behavioral analysis may process files as they are encountered (e.g., responsive to requests from security systems to analyze unrecognized files for safety). Additionally or alternatively, a system for behavioral analysis may process a queue of files waiting for assessment. Thus, as will be explained in greater detail below, a system for behavioral analysis may balance the time and resources spent analyzing one file against the time and resources to be spent analyzing queued files.

The term "file type," as used herein, generally refers to any categorization of a file regarding the format of the file, the uses of the file, the methods of interacting with the file, and/or the application (or class of application) configured to load the file. For example, "file type" may refer to the method by which information is encoded in a digital storage medium. Examples of file types include, without limitation, EXE, DLL, JAR, JPG, PNG, GIF, DOC, PDF, TXT, RTF, AVI and/or MP3. Additionally or alternatively, "file type" may also refer to a category of file types, such as images (e.g., encompassing JPG, PNG, and/or GIF files) or executables (e.g., EXE, DLL, and/or JAR files). In some examples, files of a given file type may cause some consistent behaviors among some, many, most, or all files of the given type. For example, PDF files, when loaded, may reliably cause a particular system registry location (to load settings for interacting with the PDF file) to be read or a particular Internet resource to be accessed (to check for updates to the PDF file viewer). As will be explained in greater detail below, in some examples reliable, benign behaviors associated with a file type may be disregarded when attributing behaviors to specific files of that file type.

Determination module 104 may determine the file type of the first file in any suitable manner. For example, determination module 104 may determine the file type of the first file by parsing the file to identify the format of the file. Additionally or alternatively, determination module 104 may determine the file type of the first file by identifying metadata that defines the file type of the first file. In some examples, determination module 104 may determine the file type of the first file by identifying an application associated with the first file. In some examples, determination module 104 may determine the file type of the first file via an application programming interface call to an operating system.

Determination module 104 may determine the file type of the first file in any of a variety of contexts. For example, determination module 104 may determine the file type of the first file when identifying the first file as a subject file for behavioral analysis. Additionally or alternatively, determination module 104 may determine the file type of the first file when the first file is loaded within an environment for behavioral analysis. In some examples, determination module 104 may determine the file type of the first file when recording behaviors and/or the timing of behaviors observed from the first file (e.g., so that information regarding the timing of behaviors is associated with the file type). In some examples, the first file may be subject to behavioral analysis in order to determine whether the first file exhibits behaviors of interest (e.g., malicious behaviors). Additionally or alternatively, the first file may be part of a training set of files whose behaviors are known. In this example, the first file may be subject to behavioral analysis to measure how long it takes for the known behaviors to appear. In some examples, determination module 104 may, when identifying the first file, identify instructions connected with the first file that indicate to the environment for behavioral analysis how to load and/or interact with the first file. For example, the instructions may indicate that the first file is to be opened with a double click. In another example, the instruction may indicate that the first file is to be injected as an extension into a web browser (and the web browser is to be opened). In these examples, determination module 104 may determine the file type of the first file in connection with identifying the instructions for the first file.

FIG. 4 illustrates an exemplary system 400. As shown in FIG. 4, exemplary system 400 may include virtual machines 410 and 420 for conducting behavioral analyses of files 430 and recording assessments of files based on observed behaviors in an assessment database 440. Using FIG. 4 as an example of step 302, determination module 104 may determine a file type of a file 412 subject to behavioral analysis.

Returning to FIG. 3, at step 304, one or more of the systems described herein may load the first file within an environment for behavioral analysis to observe at least one behavior within the environment attributable to the first file. For example, loading module 106 may, as part of computing device 202 in FIG. 2, load file 210 within environment 230 for behavioral analysis to observe at least one behavior within environment 230 attributable to file 210.

The term "environment," as used herein, generally refers to any computing environment within which a behavior of a file may be observed. For example, the environment may include a computing system, an operating system, a virtual machine, a simulator, and/or an emulator. In some examples, the environment may include one or more agents that automatically interact with the file (e.g., load the file, execute the file, read the file, and/or render the file) in order to elicit behaviors from the file. In some examples, the environment may include one or more agents that monitor, observe, and/or record behaviors emerging from the file.

Loading module 106 may load the first file within the environment in any of a variety of ways. For example, loading module 106 may load the first file within the environment by loading the first file within a virtual machine designated for behavioral analysis. As discussed earlier, in one example, loading module 106 may also utilize instructions regarding the first file for the environment that indicate how to open, load, and/or interact with the first file. As will be described in greater detail below, in some examples one or more of the systems described herein may determine when the first file was loaded in order to determine how long until one or more behaviors of interest manifest (and/or how long until behaviors of interest stop manifesting).

Using FIG. 4 as an example, at step 304 loading module 106 may load file 412 into virtual machine 410 for behavioral analysis to observe at least one behavior attributable to file 412.

Returning to FIG. 3, at step 306, one or more of the systems described herein may observe a malicious behavior within the environment and attribute the malicious behavior to the first file. For example, observation module 108 may, as part of computing device 202 in FIG. 2, observe malicious behavior 240 within environment 230 and attribute malicious behavior 240 to file 210.

The term "malicious behavior," as used herein, generally refers to any undesired behavior within a computing environment. For example, the term "malicious behavior" may refer to behavior that threatens to compromise the security of the computing environment, that retrieves, generates, and/or communicates with malware, that degrades the performance of the computing environment, that degrades the stability of the computing environment, and/or that represents an attack and/or exploit method associated with malware. In some examples, the term "malicious behavior" may refer to a behavior of interest that may indicate, provide evidence for, and/or be connected with an adverse outcome. For example, the malicious behavior may include attempting to download malware, to perform code injection, and/or to read and transmit sensitive data.

Observation module 108 may observe the malicious behavior in any suitable manner. For example, observation module 108 may operate as a part of an agent attached to a virtual machine that monitors input/output operations, network communications, system calls, and/or memory write and read operations. In some examples, observation module 108 may determine that the malicious behavior is malicious (e.g., by querying a behavioral fingerprint database with the observed behavior).

Observation module 108 may attribute the malicious behavior to the first file in any suitable manner. In some examples, observation module 108 may disregard and/or filter out behaviors not attributable to the first file and/or not attributable to the particular content of the first file. For example, observation module 108 may identify behaviors that are attributable to the environment independent of the first file and disregard such behaviors as irrelevant. Examples of irrelevant environmental behaviors may include network time protocol ("NTP") activity, operating system update traffic, and the like. In some examples, observation module 108 may identify behaviors attributable to the environment based on observing the environment without the first file. Additionally or alternatively, observation module 108 may identify behaviors attributable to the environment based on identifying the behaviors in the presence of many disparate files and statistically inferring that the behaviors due to the environment independent of the files.

As mentioned earlier, in some examples, files of a given file type may cause some consistent behaviors among files of the given type. Accordingly, observation module 108 may disregard and/or filter out behaviors that are attributable to the file type of the file rather than to the particular content of the file. For example, observation module 108 may filter out behaviors caused by an application responsible for loading files of the file type whenever the application loads a file rather than attributing these behaviors to the file.

Observation module 108 may observe the first file for a period of time determinable in a variety of ways. For example, in some examples the first file may belong to a training corpus (e.g., with known behaviors and/or characteristics) used for making an initial determination of how long to analyze files of given types. Accordingly, in these examples, observation module 108 may observe the first file for a fixed period of time (e.g., hard coded and/or set in an initial configuration). In some examples, the fixed period of time may not differ by file type. Additionally or alternatively, the fixed period of time may be based on manually selected values differentiated by file type. In some examples, observation module 108 may observe the first file for a period of time based on a previously calculated estimate of the optimum observation time based on a previous corpus of observations of files of that file type.

Using FIG. 4 as an example, at step 306 observation module 108 may observe one or more behaviors of file 412 within virtual machine 410. For example, observation module 108 may observe a malicious behavior attributable to file 412.

Returning to FIG. 3, at step 308, one or more of the systems described herein may determine a timing of the malicious behavior after loading the first file within the environment. For example, timing module 110 may, as part of computing device 202 in FIG. 2, determine timing 250 of malicious behavior 240 after loading file 210 within environment 230.

The term "timing," as used herein, generally refers to any information useful for ascertaining when a behavior is observed. In some examples, the term "timing" may refer to an amount of time that has passed since a starting point (e.g., when the first file was loaded). Additionally or alternatively, the term "timing" may refer to an amount of computing resources consumed and/or a number of computing operations performed since a starting point (e.g., how many clock cycles have passed), thereby potentially controlling for virtualized environments that may not run in real time. In some examples, the term "timing" may refer to a sequencing of events and/or may combine a sequencing of events with a time measurement (e.g., a behavior is observed 20 seconds after a given event is observed).

In some examples, timing module 110 may save the timing of the malicious behavior in a corpus of timing information on observed behaviors. Additionally or alternatively, timing module 110 may incorporate the timing of the malicious behavior in a statistical model that associates file types with behavior timing (e.g., to predict how long a file of a given type must be monitored in an environment in order to observe relevant behaviors of the file with a given degree of confidence). In general, timing module 110 may save and/or use the timing information in any suitable manner and any suitable format for use in subsequent behavioral analyses of files of the same file type.

Due to different ways that different file types may demonstrate various behaviors of interest (e.g., malicious behaviors), timing module 110 may contribute to an assessment that the optimal amount of time to spend analyzing a file of one type is greater than the optimal amount of time to spend analyzing a file of another time. For example, after a PDF file is observed, timing module 110 may contribute to a model indicating 30 seconds after opening a PDF file is sufficient for observing all potentially relevant behaviors attributable to the PDF file. However, after an EXE file is observed, timing module 110 may contribute to a model that indicates that 8 minutes is an optimal time for observing an EXE file after it is launched. In some examples, timing module 110 may incorporate other information into an optimal analysis time model, such as available computing resources, the relative likelihood of and/or danger posed by exploits possible in different file types, etc. In some examples, the systems described herein may weight the importance and/or relevance of various behaviors. Accordingly, late-occurring behaviors weighted highly may strongly influence a model to increase the optimal amount of time, while late-occurring behaviors weighted lightly may weakly influence the model to increase the optimal amount of time.

Timing module 110 may determine the timing of the malicious behavior in any suitable manner. For example, timing module 110 may operate as a part of an agent attached to a virtual machine that measures the time between when a file is loaded and recorded behaviors are exhibited. Additionally or alternatively, timing module 110 may operate as a part of a database, a statistical modeler, and/or a data analysis engine that processes behavioral data (including observed times of behaviors) received from an agent attached to a virtual machine.

Using FIG. 4 as an example, at step 308 timing module 110 may determine the timing of one or more behaviors attributed to file 412 and store the timing information as a part of timing data 122 in database 120.

Returning to FIG. 3, at step 310, one or more of the systems described herein may limit an amount of time dedicated to analyzing a second file within the environment based at least in part on the timing of the malicious behavior after loading the first file within the environment and due to the second file being of the same file type as the first file. For example, limitation module 112 may, as part of computing device 202 in FIG. 2, limit an amount of time dedicated to analyzing a file 260 within environment 230 based at least in part on timing 250 of malicious behavior 240 after loading file 210 within environment 230 and due to file 260 being of the same file type 220 as file 210.

Limitation module 112 may limit the amount of time in any suitable manner. For example, limitation module 112 may determine the file type of the second file. Limitation module 112 may then apply the file type to a model and/or database (e.g., previously informed by observations of the first file) to determine how long to continue a behavioral analysis of the second file. In some examples, limitation module 112 may limit the amount of time by stopping the behavioral analysis after an amount of time prescribed for the file type following the loading of the second file. Additionally or alternatively, limitation module 112 may limit the amount of time by stopping the behavioral analysis after an amount of time prescribed for the file type following the last observed behavior of interest.

In some examples, limitation module 112 may limit the amount of time dedicated to analyzing the second file within the environment based at least in part on timing information of observed malicious behaviors after loading each of a plurality of files of the file type. For example, a model, profile, formula, and/or database used for indicating the optimal amount of time for analyzing files of various file types may have been updated, modified, and/or informed by multiple observation sessions of multiple files for each file type.

In some examples, limitation module 112 may apply the same model, formula, and/or database to many files of the same file type. For example, limitation module 112 may limit the amount of time dedicated to analyzing each of a plurality of files of the file type within the environment based at least in part on the timing of the malicious behavior after loading the first file within the environment and due to the plurality of files being of the same file type as the first file.

In some examples, limitation module 112 may limit the amount of time dedicated to analyzing a second file within the environment by creating an association between the file type and a time limit that is based at least in part on the timing of the malicious behavior after loading the first file and subjecting analysis of files of the file type with the time limit based on the association between the file type and the time limit. For example, limitation module 112 may draw from data gathered by timing module 110 and/or a model generated by timing module 110 to determine a time limit for the file type.

In addition to limiting the amount of time dedicated to analyzing files of a given type, limitation module 112 may sometimes reduce such limitations. For example, systems described herein may identify a third file subject to behavioral analysis, the third file being of the file type. Limitation module 112 may then exceed the time limit associated with the file type when analyzing the third file within the environment. Because the time limit has been exceeded, the systems described herein may observe a late malicious behavior attributable to the third file after the time limit. Thus, the systems described herein may modify the association between the file type and the time limit by extending the time limit for files of the file type based at least in part on having observed the late malicious behavior after the time limit. For example, by randomly and/or periodically exceeding the established time limit for files of a given file type, the systems described herein may have an opportunity to adjust and extend previously learned time limits for some file types.

In some examples, exceeding the time limit may be at least partly in response to determining that excess computing capacity is available for the environment. For example, the systems described herein may rely on computing resources that are occasionally and/or periodically idle (e.g., an enterprise system that tends to be idle during the night). Accordingly, these systems may exceed the time limit during a behavioral analysis without impacting the performance of competing applications.

In some examples, the systems described herein may analyze the second file for the amount of time and determine that the second file is malicious. Because these systems determine the amount of time based on past observations of files of the same type (e.g., the first file), these systems may observe the second file for a sufficient amount of time to identify behaviors indicating that the second file is malicious. In addition, because these systems may limit the amount of time spent on observing files of various types to an appropriate extent, these systems may identify malicious files more quickly and efficiently. In some examples, systems described herein may also associate an identifier of the second file with an assessment of the second file indicating that the second file is malicious. For example, upon determining the second file is malicious, a fingerprint of the second file may be submitted to a malware database (e.g., for further inspection by a security vendor and/or for future look-ups by endpoint security systems).

In some examples, limitation module 112 may identify a different type of file, the different type of file being of a different file type from the file type of the first file and the second file, and limit the different type of a file to a different amount of time for analysis because the different type of file is of the different file type from the file type of the first file and the second file. Thus, limitation module 112 may allow more time for files of a file type that tends to take longer to exhibit relevant behaviors while allowing less time for files of a file type that tends to quickly exhibit any relevant behaviors.

Using FIG. 4 as an example, at step 310 limitation module 112 may, based on timing data 122 (that is partly derived from observations of file 412), limit an amount of time spent observing a file 422 in a virtual machine 420. This may free computing resources (e.g., virtual machine 420 and/or resources used by virtual machine 420) to examine more of files 430. In addition, the systems described herein may enter observations of behavioral timing information for file 422 into database 120 and may update assessment database 440 with an assessment of file 422.

As explained above in connection with method 300 in FIG. 3, the systems described herein may discern the optimum execution duration of a file or type of file (e.g., PDF documents). A corpus of files may be executed in an automated analysis environment and runtime behaviors may be monitored. By analyzing a sufficiently large corpus, it may be possible to discern behaviors performed by the file under analysis and to distill away the underlying environmental behaviors, e.g., NTP activity, MICROSOFT WINDOWS and/or software update traffic, operating system registry access, etc. Applying statistical techniques to the collected behaviors attributed to the file, along with the intelligence value of each behavior, may allow the environment to automatically discern the optimum time for a file of this type to be executed. Periodically (after N executions), a random mutation in the duration may be introduced, allowing the system to continually improve and adjust its previously learned durations, if required.

By automatically and intelligently adjusting the execution duration, on a per-file-type basis, it may be possible to achieve the same level of system efficacy while increasing throughput. In the case of some file types this improvement may represent an order of magnitude increase where exploitation occurs during document loading (e.g., when a PDF is parsed by ADOBE READER). Conversely, an executable file may take longer to exhibit its malicious behaviors and so may be allowed a longer execution duration. Accordingly, these systems and methods may allow for files to be processed more quickly, may decrease the time to disposition of files from the client perspective, and require fewer resources. Because the majority of files processed by automated malware analysis services may not actually be malicious, reducing the execution duration may allow such systems to quickly dispose of benign files.

Figure 5:
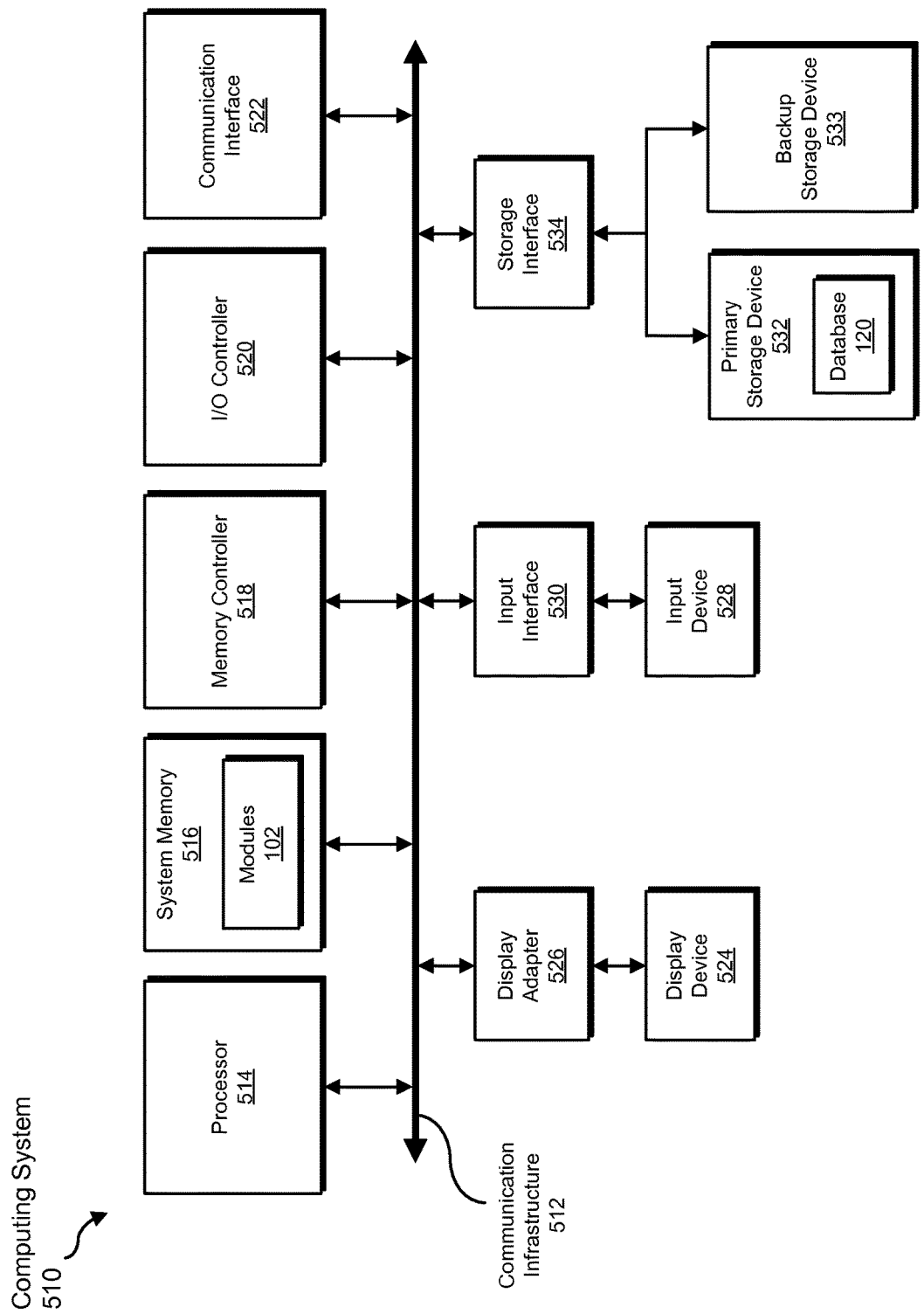
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
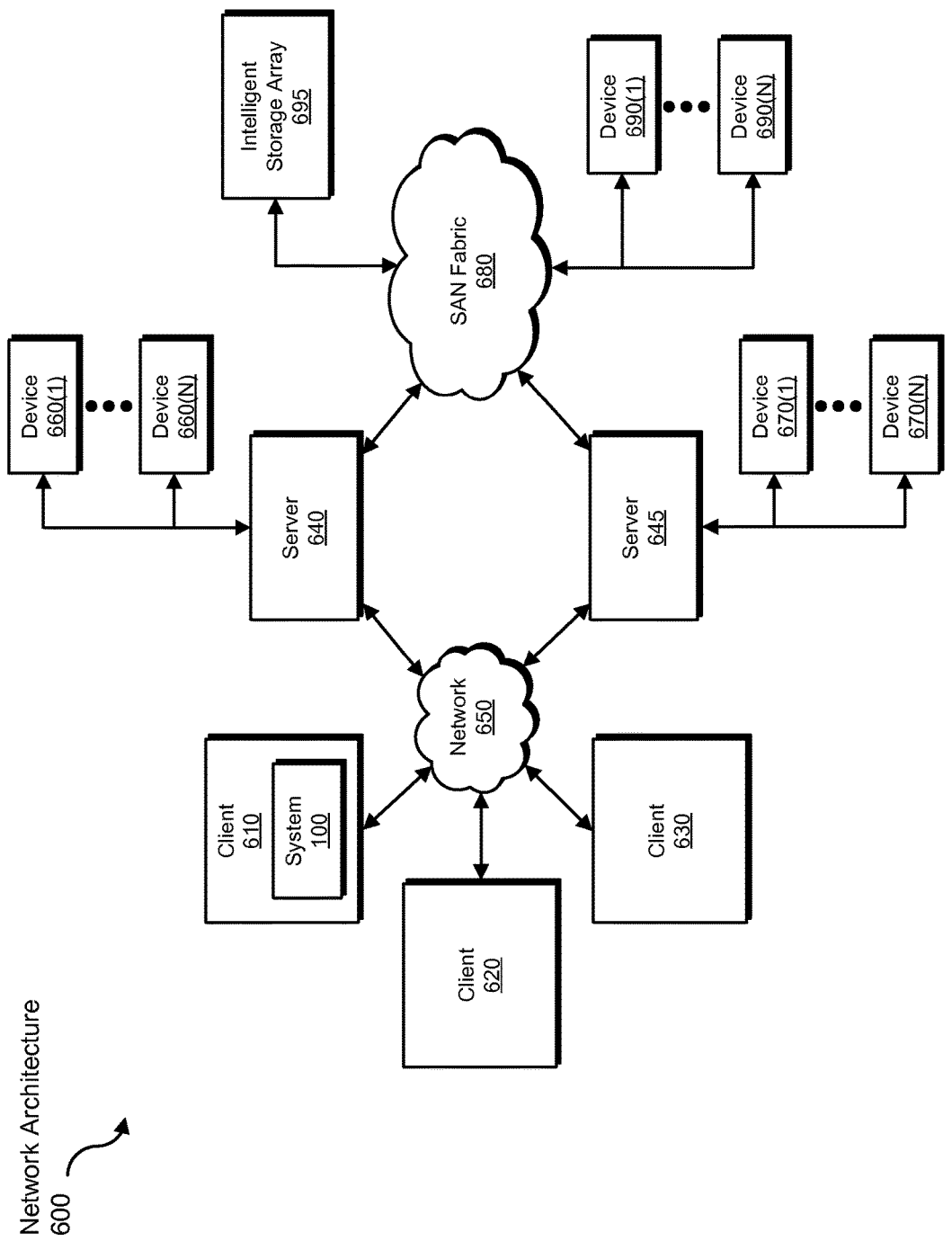
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for efficiently allocating resources for behavioral analysis.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file into timing information for the behavioral analysis of files, output a result of the transformation to a behavioral analysis environment, use the result of the transformation to determine how long to analyze other files of the same file type, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficiently allocating resources for behavioral analysis, at least a portion of the method being performed by a computing device comprising at least one processor, the method comprising:
   determining a file type of a first file subject to behavioral analysis;
   loading the first file within an environment for behavioral analysis to observe at least one behavior within the environment attributable to the first file;
   observing a malicious behavior within the environment and attributing the malicious behavior to the first file;
   determining a timing of the malicious behavior after loading the first file within the environment;
   limiting an amount of time dedicated to analyzing a second file within the environment based at least in part on the timing of the malicious behavior after loading the first file within the environment and due to the second file being of the same file type as the first file.

2. The computer-implemented method of claim 1, wherein loading the first file within the environment comprises loading the first file within a virtual machine designated for behavioral analysis.

3. The computer-implemented method of claim 1, wherein limiting the amount of time dedicated to analyzing the second file within the environment is based at least in part on timing information of observed malicious behaviors after loading each of a plurality of files of the file type.

4. The computer-implemented method of claim 1, further comprising limiting the amount of time dedicated to analyzing each of a plurality of files of the file type within the environment based at least in part on the timing of the malicious behavior after loading the first file within the environment and due to the plurality of files being of the same file type as the first file.

5. The computer-implemented method of claim 1, wherein limiting the amount of time dedicated to analyzing a second file within the environment comprises:
   creating an association between the file type and a time limit that is based at least in part on the timing of the malicious behavior after loading the first file;
   subjecting analysis of files of the file type with the time limit based on the association between the file type and the time limit.

6. The computer-implemented method of claim 5, further comprising:

identifying a third file subject to behavioral analysis, the third file being of the file type;
exceeding the time limit when analyzing the third file within the environment;
observing a late malicious behavior attributable to the third file after the time limit;
modifying the association between the file type and the time limit by extending the time limit for files of the file type based at least in part on having observed the late malicious behavior after the time limit.

7. The computer-implemented method of claim 6, wherein exceeding the time limit is at least partly in response to determining that excess computing capacity is available for the environment.

8. The computer-implemented method of claim 1, further comprising analyzing the second file for the amount of time and determining that the second file is malicious.

9. The computer-implemented method of claim 8, further comprising associating an identifier of the second file with an assessment of the second file indicating that the second file is malicious.

10. The computer-implemented method of claim 1, wherein determining the timing of the malicious behavior after loading the first file within the environment comprises measuring a length of time between loading the first file within the environment and observing the malicious behavior.

11. The computer-implemented method of claim 1, wherein the file type of the first file comprises a file format of the first file.

12. The computer-implemented method of claim 1, further comprising:
identifying a different type of file, the different type of file being of a different file type from the file type of the first file and the second file;
limiting the different type of a file to a different amount of time for analysis because the different type of file is of the different file type from the file type of the first file and the second file.

13. A system for efficiently allocating resources for behavioral analysis, the system comprising:
a determination module, stored in memory, that determines a file type of a first file subject to behavioral analysis;
a loading module, stored in memory, that loads the first file within an environment for behavioral analysis to observe at least one behavior within the environment attributable to the first file;
an observation module, stored in memory, that observes a malicious behavior within the environment and attribute the malicious behavior to the first file;
a timing module, stored in memory, that determines a timing of the malicious behavior after loading the first file within the environment;
a limitation module, stored in memory, that limits an amount of time dedicated to analyzing a second file within the environment based at least in part on the timing of the malicious behavior after loading the first file within the environment and due to the second file being of the same file type as the first file;
at least one physical processor configured to execute the determination module, the loading module, the observation module, the timing module, and the limitation module.

14. The system of claim 13, wherein the loading module loads the first file within the environment by loading the first file within a virtual machine designated for behavioral analysis.

15. The system of claim 13, wherein the limitation module limits the amount of time dedicated to analyzing the second file within the environment based at least in part on timing information of observed malicious behaviors after loading each of a plurality of files of the file type.

16. The system of claim 13, the limitation module limits the amount of time dedicated to analyzing each of a plurality of files of the file type within the environment based at least in part on the timing of the malicious behavior after loading the first file within the environment and due to the plurality of files being of the same file type as the first file.

17. The system of claim 13, wherein the limitation module limits the amount of time dedicated to analyzing a second file within the environment by:
creating an association between the file type and a time limit that is based at least in part on the timing of the malicious behavior after loading the first file;
subjecting analysis of files of the file type with the time limit based on the association between the file type and the time limit.

18. The system of claim 17, wherein:
the determination module further identifies a third file subject to behavioral analysis, the third file being of the file type;
the loading module further exceeds the time limit when analyzing the third file within the environment;
the observation module further observes a late malicious behavior attributable to the third file after the time limit;
the limitation module further modifies the association between the file type and the time limit by extending the time limit for files of the file type based at least in part on having observed the late malicious behavior after the time limit.

19. The system of claim 18, wherein the loading module exceeds the time limit at least partly in response to determining that excess computing capacity is available for the environment.

20. A non-transitory computer-readable medium comprising one or more computer-readable instructions that, when executed by at least one processor of a computing device, cause the computing device to:
determine a file type of a first file subject to behavioral analysis;
load the first file within an environment for behavioral analysis to observe at least one behavior within the environment attributable to the first file;
observe a malicious behavior within the environment and attributing the malicious behavior to the first file;
determine a timing of the malicious behavior after loading the first file within the environment;
limit an amount of time dedicated to analyzing a second file within the environment based at least in part on the timing of the malicious behavior after loading the first file within the environment and due to the second file being of the same file type as the first file.

* * * * *